S S. BARRY.
Hub.
No. 8,623.  Patented Jan. 6, 1852.
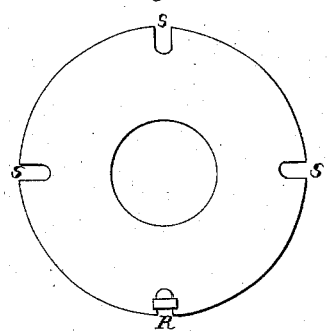
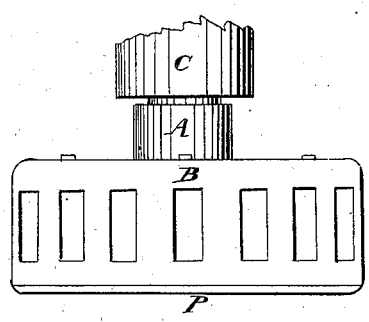
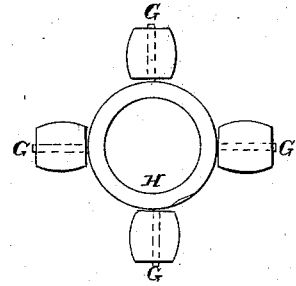
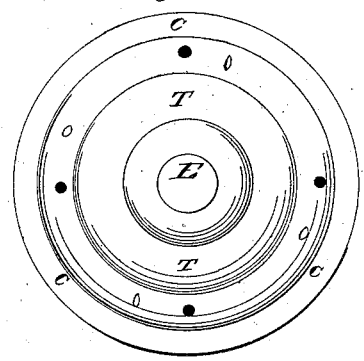
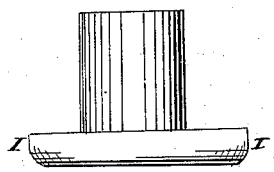
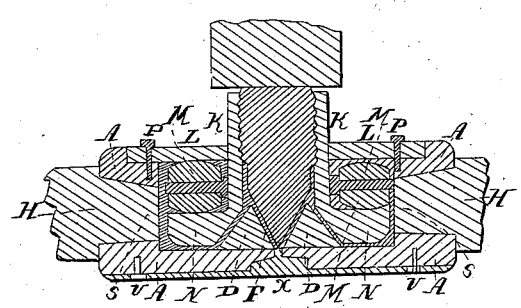
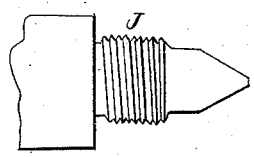

UNITED STATES PATENT OFFICE.

S. S. BARRY, OF BROWNHELM, OHIO.

CARRIAGE-HUB.

Specification of Letters Patent No. 8,623, dated January 6, 1852.

*To all whom it may concern:*

Be it known that I, SAML. S. BARRY, of Brownhelm, in the county of Lorain and State of Ohio, have invented a new and Improved Mode of Constructing Carriage-Hubs; and I do hereby declare that the following is a clear, full, and exact description of the construction and operation of the same, reference being had to the annexed drawings, and letters of reference marked thereon, making part of this specification.

Figure 1 view of the hub; Fig. 2, transverse view; the other sections will be referred to in the further description of my invention.

To enable others skilled in the art to make and use my invention I will proceed to describe its construction and operation.

I construct my hubs generally of cast or malleable iron, making them for ordinary use about two inches in length and five and a half inches in diameter, the size of the hub in all cases to be made in proportion to the size of the vehicle.

Fig. 2 is a transverse view of the hub Fig. 1, the parts in Fig. 2 marked A A A A being the same as the outside of the hub at B in Fig. 1, C in Fig. 3 being also the same.

The projections D D in Fig. 2 form the female center as seen at E Fig. 3 which revolves upon the male center F Fig. 2.

A set of four or more rollers Fig. 5 revolves upon arms in the manner as shown at G projecting from the ring H. This set of rollers being so arranged is slipped over the thimble or nut Fig. 6 against the flange I, the thimble having a screw inside corresponding with the screw J on the male center Fig. 7, the screw J and the male center Fig. 7 being the same in place at the screws K K and center F in Fig. 2. The flange Fig. 4 is likewise slipped on the thimble Fig. 6 against the rollers Fig. 5. The thimble is then screwed on the male center Fig. 7 which is the end of the axle. Being thus arranged and combined in the manner as seen at L M N and F Fig. 2 each piece being thus in its proper place it is then in working condition.

The hub is retained upon the axle by means of the flange Fig. 4 which is in place at L Fig. 2. The recess in which the flange is placed corresponds to the recess O Fig. 3. By this means the flange is even with the outside of the hub, presenting a neat and finished appearance, the flange being securely attached to the hub by the screws P P which are four or more in number and having a T head as shown at R Fig. 4. It being necessary only to turn the head parallel with the gains S in the flange when it is necessary to remove the wheels from the carriage without taking the screws entirely out of the hub. The chambers S S Fig. 2 corresponds to the chambers T Fig. 3.

By the combination and arrangement of the rollers Fig. 5 centers Fig. 7 in connection with the thimble Fig. 6 as seen in place at M N and F by this mode of construction the friction is much less than in the usual manner of constructing hubs and axles. The friction of my hub is confined chiefly to the hardened steel centers at F Fig. 2.

In the axles and hubs now in use there is a large amount of friction at the shoulders of the axles and washers against the ends of the boxes by the lateral motion of the wheel. This difficulty is removed by the introduction of the rollers M M Fig. 2, the rollers being in contact with the collar of the thimble and flange removes nearly all the friction caused by the lateral pressure, this I consider a novel feature of my invention. By this construction and arrangement it is more durable than the common hub as well as less subject to friction. The friction being at a point when it is easily repaired without injury to the hub, it being also much lighter and more compact, and at the same time embracing all the essential features requisite for durability and ease of action.

The parts inside are easily oiled by means of the oil chambers X Fig. 2 which communicates directly with the inside. To keep the inside free from grit and give a finished appearance to the hub a metallic plate is attached to the outside end of the hub as shown U U Fig. 2 and P Fig. 1. The spokes are inserted in the hub as seen at H Fig. 2.

When it is desirable to take off the wheel from the axle without removing the flange L Fig. 2 it is done by unscrewing the thimble at A from the axle C Fig. 1. The rollers M Fig. 2 which revolve upon the arms V V and the ring to which they are attached move around the thimble in such a manner as will cause the carriage to move with ease.

What I claim as my invention and desire to secure by Letters Patent is—

5   The combination of the conical bearing point F (Fig. 2) the female center or step D, the thimble N rollers M and flange L arranged in the manner substantially as described and for the purpose set forth.

SAML. S. BARRY.

Witnesses:
  WILLIAM P. HARRIS,
  HENRY SAGE.